US011125472B2

(12) United States Patent
Toews et al.

(10) Patent No.: US 11,125,472 B2
(45) Date of Patent: Sep. 21, 2021

(54) FLUID FOR USE IN POWER PRODUCTION ENVIRONMENTS

(71) Applicant: EAVOR TECHNOLOGIES INC., Calgary (CA)

(72) Inventors: Matthew Toews, Calgary (CA); Glenn Price, Calgary (CA); Paul Cairns, Calgary (CA); John Redfern, Los Angeles, CA (US); Jeff Smith, Clive (CA)

(73) Assignee: Eavor Technologies Inc., Calgary (CA)

( * ) Notice: Subject to any disclaimer, the term of this patent is extended or adjusted under 35 U.S.C. 154(b) by 141 days.

(21) Appl. No.: 16/389,962

(22) Filed: Apr. 21, 2019

(65) Prior Publication Data

US 2019/0346181 A1    Nov. 14, 2019

Related U.S. Application Data

(60) Provisional application No. 62/669,686, filed on May 10, 2018.

(51) Int. Cl.
| F24T 50/00 | (2018.01) |
| F24T 10/40 | (2018.01) |
| F24T 10/15 | (2018.01) |
| E21B 7/04 | (2006.01) |
| F24T 10/00 | (2018.01) |

(52) U.S. Cl.
CPC ............... *F24T 50/00* (2018.05); *E21B 7/04* (2013.01); *F24T 10/15* (2018.05); *F24T 10/40* (2018.05); *F24T 2010/53* (2018.05); *F24T 2010/56* (2018.05)

(58) Field of Classification Search
USPC ............................................. 60/641.2–641.5
See application file for complete search history.

(56) References Cited

U.S. PATENT DOCUMENTS

| 3,537,529 A | 11/1970 | Timmerman |
| 3,757,516 A | 9/1973 | McCabe |
| 3,810,510 A | 5/1974 | Fitch et al. |
| 3,878,884 A | 4/1975 | Raleigh |
| 4,059,959 A | 11/1977 | Matthews |
| 4,255,933 A | 3/1981 | Bailey et al. |

(Continued)

FOREIGN PATENT DOCUMENTS

| CN | 102476804 | 5/2012 |
| JP | 2017/508921 | 3/2017 |

(Continued)

OTHER PUBLICATIONS

AU Examination Report ssued in Australian Appln. No. 2019202101, dated May 29, 2020, 6 pages.

(Continued)

*Primary Examiner* — Mark A Laurenzi
*Assistant Examiner* — Mickey H France
(74) *Attorney, Agent, or Firm* — Fish & Richardson P.C.

(57) ABSTRACT

Fluid classes for use in energy recovery in well and geothermal environments for power production are disclosed. The fluids fall into the classes of fluids being capable of increasing thermodynamic efficiency of electricity and/or heat generation from a closed-loop geothermal system. Numerous methods are disclosed which exploit the thermodynamics of the fluids for optimum energy recovery.

15 Claims, 13 Drawing Sheets

(56) References Cited

U.S. PATENT DOCUMENTS

| | | | |
|---|---|---|---|
| 4,538,673 A | 9/1985 | Partin et al. | |
| 4,719,759 A * | 1/1988 | Zaslavsky | F03G 7/04 60/641.8 |
| 4,776,169 A | 10/1988 | Coles, Jr. | |
| 4,912,941 A | 4/1990 | Buchi | |
| 4,996,846 A | 3/1991 | Bronicki | |
| 5,277,823 A * | 1/1994 | Hann | C02F 5/08 127/61 |
| 5,515,679 A | 5/1996 | Shulman | |
| 5,598,706 A | 3/1997 | Bronicki et al. | |
| 5,671,602 A | 9/1997 | Bronicki et al. | |
| 6,009,711 A | 1/2000 | Krieger et al. | |
| 6,247,313 B1 | 6/2001 | Moe et al. | |
| 6,301,894 B1 | 10/2001 | Halff | |
| 6,668,554 B1 | 12/2003 | Brown | |
| 7,475,741 B2 | 1/2009 | Waters | |
| 9,541,309 B2 | 1/2017 | Colwell | |
| 9,803,626 B1 | 10/2017 | Eastman et al. | |
| 2006/0048770 A1 * | 3/2006 | Meksvanh | E21B 41/0057 126/620 |
| 2007/0245729 A1 | 10/2007 | Mickleson | |
| 2010/0116473 A1 | 5/2010 | Yang et al. | |
| 2011/0035154 A1 * | 2/2011 | Kendall | C04B 7/364 702/14 |
| 2011/0048005 A1 | 3/2011 | McHargue | |
| 2011/0056683 A1 | 3/2011 | Duncum et al. | |
| 2011/0154737 A1 | 6/2011 | Wexler | |
| 2011/0277468 A1 | 11/2011 | Zachar | |
| 2012/0174581 A1 | 7/2012 | Vaughan et al. | |
| 2013/0056171 A1 | 3/2013 | Klemencic | |
| 2013/0152578 A1 | 6/2013 | Solem | |
| 2013/0213040 A1 | 8/2013 | Goswami et al. | |
| 2013/0298581 A1 | 11/2013 | Kontomaris | |
| 2013/0300127 A1 | 11/2013 | Dinicolantonio | |
| 2014/0047836 A1 | 2/2014 | Parrella | |
| 2017/0130703 A1 | 5/2017 | Muir et al. | |
| 2017/0211849 A1 | 7/2017 | Muir et al. | |
| 2018/0283799 A1 | 10/2018 | Sakai et al. | |

FOREIGN PATENT DOCUMENTS

| | | |
|---|---|---|
| JP | 2017/525870 | 9/2017 |
| KR | 10-20090028707 | 3/2009 |
| KR | 10-20110052571 | 5/2011 |
| WO | 2007/131281 | 11/2007 |
| WO | 2009/151649 | 12/2009 |
| WO | 2014/015307 | 1/2014 |

OTHER PUBLICATIONS

CA Office Action issued in Canada Appln. No. 3,038,294, dated Jul. 5, 2019, 8 pages.
CA Office Action issued in Canada Appln. No. 3,038,294, dated Oct. 15, 2019, 4 pages.
EP Communication Pursuant to Article 94 (3) EPC issued in European Application 19170948.4 dated Sep. 8, 2020, 4 pages.
Hingerl et al., "A new aqueous activity model for geothermal brines in the system Na—K—Ca—Mg—H—Cl—SO4—H2O from 25 to 300° C." Chemical Geology 381, 2014, 78-93, 16 pages.
IS Office Action issued in Iceland Appln. No. IS9115, dated Aug. 17, 2020, 5 pages.
Jody et al., "Capture of Geothermal Heat as Chemical Energy." Energy Sources, Part A: Recovery, Utilization, and Environmental Effects 37.24, 2015, 2647-2654, 9 pages.
JP Office Action issued in Japanese Appln. No. 2019-089,962, dated Sep. 7, 2020, 10 pages (With English Translation).
KR Office Action issued in Korean Appln. No. 10-2020-7019192, dated Mar. 22, 2021, 6 pages.
NZ Examination Report issued in New Zealand Appln. No. 764224, dated Jun. 17, 2020, 3 pages.
NZ Examination Report ssued in New Zealand Appln. No. 764224, dated Nov. 19, 2020, 4 pages.
Parmanto, "Thermodynamic Optimization of Downhole Heat Exchangers for Geothermal Power Generation" MS thesis. Izmir Institute of Technology, 82 pages.
Radutovic et al., "On the potential of zeotropic mixtures in supercritical ORC powered by geothermal energy source." Energy conversion and management 88, 2014, 365-371, 7 pages.
Zhao et al., "Evaluation of zeotropic refrigerants based on nonlinear relationship between temperature and enthalpy." Science in China Series E 49.3, 2006, 322-331, 10 pages.

* cited by examiner

FLUID FOR USE IN POWER PRODUCTION ENVIRONMENTS

The present invention relates to fluids for power production in a variety of geothermal and well environments and more particularly, the present invention relates to the use of classes of fluids used in methods for generating power.

BACKGROUND OF THE INVENTION

The benefits of geothermal energy are well known and have been the subject matter of many publications and patents. The general concept is to drill into a formation to extract heat therefrom and return the generated steam and water to the surface where the steam drives, for example, a power generating device. Traditional industrial geothermal technology requires rare geological conditions causing the technology to remain niche on a global scale.

In the realm of the prior art, proposals have been promulgated to assuage the issue. Closed-Loop geothermal systems wherein no brine is extracted from the rock have been considered and systems tested to assess the feasibility of exploiting the geothermal gradient. It has been discussed to use a series of tubes to be inserted in the ground for water within the tubes to absorb the heat and recirculate it to the surface and subsequently into a recovery device for use of the heat.

The geothermal gradient is generally defined as the rate of temperature increase relative to increasing depth in the interior of the Earth. Quantitatively, this represents approximately 25° C. for each kilometer. As such, this amount of energy is too substantive to leave unused.

Roussy, in U.S. Pat. No. 8,132,631, issued Mar. 13, 2012, teaches a geothermal loop installation where a sonic drill is provided for rotating and vibrating a drill string into the ground. Fluid is provided within the interior volume of the string. A geothermal transfer loop is positioned within the interior volume of the drill string and the drill string is removed from the ground.

Although useful in certain scenarios, the limitation with this arrangement is only a small area of the loop is exposed to a geothermal zone. This inherently limits efficient heat transfer.

The interconnection of wells is recognized by Henderson, in U.S. Pat. No. 3,941,422, issued Mar. 2, 1976. In the teachings, two wells are drilled into the salt bed, with one being essentially vertically arranged and the drilled distally from the first well and deflected towards the first well in such a manner that the bottom of the deflected well approaches within a selected distance of the bottom of the first well. Subsequently, the salt is fractured by the use of the liquid fracturing technique in one or the other or both of the two wells, to enable fluid flow between the two wells. The salt is mined by fresh water injection with recovery of saturated salt solution from the other well.

It is clear that Henderson teaches paired wells generally connected, but the teachings do not contemplate an energy recovery or heat exchange system driven by geothermal energy.

WellStar Energy, in a press release dated Dec. 1, 2016 briefly touches on the possibility of incorporating unused wells with a geothermal loop for energy recovery, however no specific details are mentioned in this regard or for interconnection of wells for thermal management.

Chevron, in an undated video disclosure, taught gas well interconnection at the Congo River Canyon Crossing Pipeline Project. An interconnecting pipeline was run from one side of the river to the other for supplying gas. Again, this was a specific use for well interconnection. Well recycle and interconnection in a geothermal loop was not discussed.

GreenFire Energy, in an article dated 2017, discuss a looped geothermal energy recovery system. Rather than using preexisting gas/oil wells for repurposing, new wells are drilled. This does nothing to control improperly maintained unused wells and in fact may contribute to new problems. The disclosure is silent on techniques used to effect the loop and further does not contemplate clustering and consolidation necessary for maximum efficiency. Furthermore, contemplated working fluids consist of $CO_2$ and other refrigerants, none of which exhibit a substantially non-linear temperature-enthalpy relationship at pressures and temperatures of relevance for energy production from the geothermal gradient.

Halff, in U.S. Pat. No. 6,301,894, issued Oct. 16, 2001 teaches a general flash geothermal plant. The patent is focused on benefits related to generator location, water conservation and purity and efficiency with multiple loops. The Patentee indicates:

"The present invention overcomes these difficulties and has for one of its objects the provision of an improved geothermal power generation system in which the water obtaining heat from the hot rock strata does not become contaminated so that it can be recycled, does not require chemical treatment beyond that used in standard boiler water treatment, and is economical in the amount of water used. Another object of the present invention is the provision of an improved geothermal power generation system in which the turbine turning a generator or other mechanism that is to be powered by the steam needed not be located near the input well that is used to receive water into the ground and can be at a location remote from that well. Another object of the present invention is the provision of an improved geothermal power generation system in which the system is more efficient. Another object of the present invention is the provision of an improved geothermal power generation system in which the system is easy to install because the wells can be drilled by horizontal well drilling techniques in common use in the oil industry. The improved geothermal power generation system is simple to use. Another object of the present invention is that the system is maintained without withdrawing water from the strata so that the pressure in the strata is maintained."

Half, generally discusses multiple legs in the system, however no details are provided in this complex area. It is indicated in the text that:

"A variation of the system described above is shown Figure. All of the elements of the System shown in FIG. 1 are present. The same results are accomplished with a single vertical well and one or more horizontal wells. The water is returned to the horizontal reach of the well with a tubing that extends down the casing and discharges at the end of the casing. The water is converted to steam as it flows back out the single well and hence to the turbine.

In either embodiment, the treated water may be at either end of the hot water leg or distributed along all or part of the hot water leg.

In the drawing, it will be understood that there be one or more hot legs. The hot legs may all operate at the same time or they may be used in sequence with one hot leg in operation while the other legs are heating up until the other legs are ready and are sequentially put into service."

This over simplification does not address the fact that several new wells are required which adds cost and provides no instruction regarding the connection or thermal management of the multiple feed streams. Further Halff only references water as a working fluid and references water transitioning to steam, which requires much higher temperatures than targeted in the present invention.

United States Patent Publication, 20110048005, McHargue, published Mar. 3, 2001, provides variation in the production fluid choice to address temperature fluctuation within the formation. The text states:

"A novel aspect of this embodiment is the opportunity it affords to use a wide variety of potential fluids as the production fluid as well as the ability to rapidly and easily change production fluids as subterranean temperatures change or as conditions in the power plant change. The user has the option to use fluids or gasses other than water as production fluids in order to optimize the thermal properties of the production fluid to the local thermal conditions of the earth's subsurface, and the thermal requirements of the power plant. For example, one may choose to utilize supercritical fluids (U.S. Pat. No. 6,668,554 by D. W. Brown, 2003) or any hydrocarbon or refrigerant as the production fluid to feed a power plant. The potential to use fluids or gasses other than water as the production fluid will save money by providing the potential to drill cooler subterranean rocks at shallower depths where porosity and permeability are higher, and by reducing the need to artificially fracture the subterranean rock formations."

Although the publication alludes to techniques used in the petroleum industry, there is no discussion regarding repurposing of existing oilfields or use of existing wells. The reference discusses simple non-reactive fluids for use in a geothermal environment in a broad manner. Teachings regarding increased efficiency by fundamentally increasing heat transfer from the rock are absent as are advanced details in respect of creating a substantially non-linear temperature profile within the lateral portion of a well.

Mickelson, in United States Patent Publication 20070245729, published Oct. 25, 2007, teaches a multiple leg geothermal recovery system. The publication expresses a concern about geo-fluid loss and thus temperature loss and does not provide any teachings to mitigate the east-west problems associated with directional drilling, i.e. magnetic interference, fish, heavy iron concentration in the formation inter alia.

In United States Patent Publication No. 2013021304, published Aug. 22, 2013 by Goswami et al. there is provided a method and system for generating power from low and mid temperature heat sources.

The author teaches a zeotropic mixture as a working fluid heated to a supercritical state by exchanging heat from a sensible heat source. The teachings combine a supercritical Rankine cycle and a zeotropic mixture. The working fluid is heated directly from a liquid to a supercritical state, which improves the thermal matching between the sensible heat source and the working fluid. Using a zeotropic mixture as the working fluid, creates a better thermal match between the working fluid and the cooling agent. The present invention takes the opposite approach wherein the temperature difference between the heat source and fluid is maximized rather than matched.

GreenFire Energy Inc., in WO 2015/134974, published Sep. 11, 2015, teach a process and method for producing geothermal power.

The authors teach a closed-loop geothermal system where:

"The heat transfer fluid circulating through the system may include one or more of carbon dioxide, nitrogen, ammonia and/or amines with carbon number $C_i$ through $C_6$, hydrocarbons with carbon number $C_i$ through $C_8$, hydrocarbons with carbon number $C_i$ through $C_{io}$ with one or more hydrogens being replaced by chlorine or fluorine. In some embodiments, the circulating fluid is supercritical carbon dioxide." Teachings regarding increased efficiency by fundamentally increasing heat transfer from the rock are absent. Furthermore, all the fluids contemplated do not exhibit a nonlinear temperature-enthalpy relationship at pressures and temperatures relevant for energy production from the geothermal gradient, greater than 10 MPa and less than 180° C. respectively.

Representative as only a sample of the rather significant volume of prior art in the geothermal area, it is clear that there still exists a need for fluids capable of favourable thermodynamics in a host of different geothermal and well environments. The present technology to be delineated herein addresses this need.

The present invention provides fluid classes in novel applications to produce power with an integrated cycle and segregated cycle by a clear understanding of the thermodynamics involved in a variety of geothermal and well environments.

A number of advantages are evident from the technology, including, for example:

A) The technology provides a viable alternative for energy production once fossil fuel burning is phased out;
B) The geothermal driver for the method is continuously available 24 hours regardless of wind speed or overcast weather;
C) The technology obviates the intermittent supply associated with solar and wind energy production;
D) The geothermal gradient is substantially uniform throughout vast areas and thus enabling widespread application of the technology to areas where traditional geothermal is not possible;
E) A closed-loop system allows the use of novel fluids described herein which can increase thermodynamic efficiency. These novel fluids fundamentally increase the energy recovered from the geothermal formation;
F) The technology completely avoids any calculated environmental transgressions;
G) Satellite configurations are possible of consolidated wells in order to allow use of the greatest number of wells in a given area; and
H) By incorporating existing wells or wellsites which may be dilapidated, leaking or otherwise rendered hazardous, these can be modified when used in practicing the method;

This enumeration of advantages is illustrative as opposed to exhaustive.

SUMMARY OF THE INVENTION

A global object of the present invention is to provide fluid classes for heat and power production in a variety of well and geothermal environments for maximum energy recovery.

Another object of one embodiment of the present invention is to provide a fluid for energy recovery use in a well system having an inlet well, an outlet well and lateral interconnection between, the fluid having at least one property selected from the group, comprising:

a) a substantially nonlinear temperature enthalpy relationship within said lateral interconnection at pressures greater than 10 MPa and temperatures less than 180° C. to maximize the temperature differential and heat transfer between the fluid and the surrounding downhole heat source;

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection; and utilizing the thermal energy from said fluid directly and/or converting energy from said fluid into electrical power.

Classes of compounds subscribing to the above noted properties increase the temperature difference between the far-field rock temperature and the circulating fluid temperature, thus driving higher heat transfer from the geologic formation.

At lower pressures (depths), a liquid boiling into a gas exhibits a nonlinear temperature-enthalpy relationship. However, no simple liquids/gases have this property at pressures and temperatures relevant for energy production from the geothermal gradient, greater than 10 MPa and less than 180° C. respectively.

In one form, the fluid may comprise an aqueous solution of magnesium sulphate.

A still further object of one embodiment of the present invention is to provide a method of generating power, comprising:

providing a closed well loop circuit having an inlet and an outlet connected with a lateral conduit within a geological formation;

providing a power generation apparatus in operative communication with the well loop;

circulating a fluid having a substantially nonlinear temperature enthalpy relationship within said lateral conduit at pressures greater than 10 MPa and temperatures less than 180° C. through said circuit to recover heat energy from said formation to maximize the temperature differential and heat transfer between the fluid and the surrounding downhole heat source;

cooling the fluid prior to recirculation in said loop at the inlet; and converting energy from said fluid into electrical power.

Yet another object of one embodiment of the present invention is to provide a method of repurposing an oilfield having pre-existing production wells and injection wells in spaced relation in a formation to capture heat energy, comprising:

providing a first node having a production well and a first injection well in fluid communication with a power generation apparatus;

providing a second node having a production well and a second injection well in fluid communication with a power generation apparatus in spaced relation to said first node;

connecting said first node and said second node in a subterranean horizontal connection;

circulating heated output fluid from said power generation apparatus of said first node to an input of said power generation apparatus of said second node with a subterranean connection, said fluid having a substantially nonlinear temperature enthalpy relationship within said subterranean horizontal connection at pressures greater than 10 MPa and temperatures less than 180° C. to recover heat energy from said formation to maximize the temperature differential and heat transfer between said fluid and the surrounding downhole heat source; and utilizing the thermal energy from said fluid directly and/or converting energy from said fluid into electrical power.

A further object of one embodiment of the present invention is to provide an energy production method comprising:

providing a suspended oilfield having injection and production well pairs;

connecting a power generation apparatus between the production well of one well pair and the injection well of an adjacent well pair in a subterranean loop, said loop having at least one lateral interconnection between said production well and said injection well;

circulating a fluid through said loop to recover subterranean heat energy, said fluid having at least one property selected from the group comprising:

a) a substantially nonlinear temperature enthalpy relationship within said lateral interconnection at pressures greater than 10 MPa and temperatures less than 180° C. to maximize the temperature differential and heat transfer between the fluid and the surrounding downhole heat source:

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection; and utilizing thermal energy from said fluid directly and/or converting energy from said fluid into electrical power.

Advantageously, the fluid can be selected based on the configuration of the wells, heat source quality inter alia to maximize efficiency.

A still further object of one embodiment of the present invention is to provide a geothermal method, comprising:

drilling a first generally U shaped bore hole into an earth formation and a second generally U shaped bore hole in spaced relation therefrom;

providing a power generation apparatus;

connecting in a subterranean position said apparatus to an output of said first U shaped bore hole and an inlet of said second U shaped bore hole;

circulating a fluid through each said bore hole, said fluid having at least one property selected from the group comprising:

a) a substantially nonlinear temperature enthalpy relationship within the lateral interconnection at pressures greater than 10 MPa and temperatures less than 180° C. to maximize the temperature differential and heat transfer between the fluid and the surrounding downhole heat source;

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection; and converting energy from said fluid into electrical power.

Depending on the specifics of the environment in which the method is practiced, a suitable fluid may be selected from those embraced by the classes as noted previously.

Another object of one embodiment of the present invention is to provide a geothermal method, comprising:
drilling a first generally U shaped bore hole into an earth formation and a second generally U shaped bore hole in spaced relation therefrom;
providing a power generation apparatus;
connecting in a subterranean position the apparatus to an output of the first U shaped bore hole and an inlet of the second U shaped bore hole;
circulating a fluid through each bore hole; and
converting energy from said fluid into electrical power.

As a further object of one embodiment of the present invention, there is provided a method of forming a geothermal heat exchanger, comprising:
providing a unused drilled well;
drilling a second well in spaced relation to said unused well;
linking said unused drilled well and said second well within a geothermal zone and a second zone spaced therefrom in a continuous loop having at least one lateral linking interconnection;
circulating a working liquid through said loop for heat exchange within said loop, said fluid having at least one property selected from the group comprising:
a) a substantially nonlinear temperature enthalpy relationship within the lateral interconnection at pressures greater than 10 MPa and temperatures less than 180° C. to maximize the temperature differential and heat transfer between the fluid and the surrounding downhole heat source;
b) capable of undergoing a pressure-sensitive reversible reaction which is endothermic at elevated pressure and exothermic at pressure lower than the elevated pressure;
c) a fluid mixture containing a chemical absorption reaction which is endothermic within the lateral interconnection;
d) an aqueous electrolyte solution with temperature and pressure dependent solubility, resulting in an endothermic effect within the lateral interconnection; and
utilizing thermal energy from said fluid directly and/or converting energy from said fluid into electrical power.

A still further object of one embodiment of the present invention is to provide a method for recycling unused drilled wells, comprising:
designating a first unused well as a receiving hub;
drilling a second new well adjacent said hub;
drilling at least a third new well spaced from the hub and the second new well;
connecting in fluid communication each of the second new well and the third well with said hub in individual closed loops each having at least on lateral interconnection, a first section of each loop being within a geothermal zone and a second section being above said geothermal zone;
circulating a working fluid within the loops, the fluid having at least one property selected from the group comprising:
a) a substantially nonlinear temperature enthalpy relationship within the lateral interconnection at pressures greater than 10 MPa and temperatures less than 180° C. to maximize the temperature differential and heat transfer between the fluid and the surrounding downhole heat source;
b) capable of undergoing a pressure-sensitive reversible reaction which is endothermic at elevated pressure and exothermic at pressure lower than the elevated pressure;
c) a fluid mixture containing a chemical absorption reaction which is endothermic within the lateral interconnection;
d) an aqueous electrolyte solution with temperature and pressure dependent solubility, resulting in an endothermic effect within the lateral interconnection; and
capturing heat energy transferred from said geothermal zone.

Yet another object of one embodiment of the present invention is to provide a method of generating power, the method comprising:
providing a closed well loop circuit having an inlet and an outlet connected with a lateral conduit within a geological formation and a first working fluid;
providing a power generating circuit having a second working fluid, the circuit in thermal transfer communication with the well loop circuit;
circulating the first working fluid and the second working fluid within the respective circuits;
transferring heat from the first working fluid to the second working fluid; and
generating power from recovered heat energy.

By appreciation of the thermodynamic properties of the fluid, the technology affords broad applicability in very beneficial power generation and direct heat use environments.

Other objects and features of the technology will be evident upon further perusal of the text.

Having thus generally described the invention, reference will now be made to the accompanying drawings.

BRIEF DESCRIPTION OF THE DRAWINGS

Similar numerals used in the Figures denote similar elements.

DETAILED DESCRIPTION OF THE PREFERRED EMBODIMENTS

Figure 1:
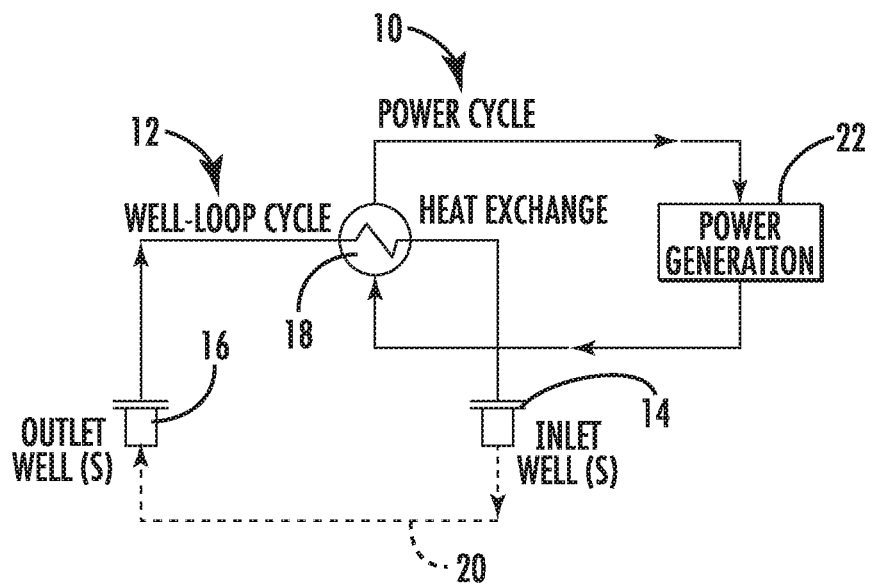
FIG. 1 is a schematic illustration of a segregated well loop and power cycle in one embodiment.

In FIG. 1, shown is a schematic illustration of first embodiment of the invention. This is referred to as a segregated well loop and power cycle. A power cycle 10 is integrated with a well loop cycle 12. The power cycle 10 may be selected from any of those suitable and known such as a Stirling cycle, carbon carrier cycle, Kalina cycle, organic Rankine cycle, carbon dioxide transcritical power cycle, inter alia.

In the Figure, the well loop 12 comprises a closed loop system having an inlet well 14 and an outlet well 16, typically disposed within a geological formation, which may be, for example, a geothermal formation, low permeability formation, sedimentary formation, volcanic formation or "basement' formation which is more appropriately described as crystalline rock occurring beneath the sedimentary basin (none being shown).

The well loop 12 and power cycle 10 are in thermal contact by heat exchanger 16 which recovers heat from the working fluid circulating in the loop circuit 20 in the formation which is subsequently used to generate power with generator 22 in cycle 10. As an example, the temperature of the formation may be in the range of between 80° C. and 250° C.

In the arrangement illustrated, two distinct working fluids are used. By modifying the working fluid used within the well loop, operation of the system can be more efficient.

The existing power cycles supra require a simple water-based fluid within the well loop itself which absorbs heat from the rock and then transfers this heat into the secondary power cycle working fluid in a heat exchanger. In conventional geothermal projects, the water chemistry is set by the reservoir conditions. In most cases the water is a heavy brine with high total dissolved solids (TDS) content above 10,000 ppm that causes two problems, namely corrosion and scaling. Corrosion issues in the downhole pipes, tools, and within the surface facility and surface flow lines are common and expensive to manage. In addition, there is usually significant silica or other precipitates in solution at the reservoir conditions. When the brine is brought to surface and cooled in the primary heat exchanger (to transfer energy into the power cycle's working fluid), silica or other minerals precipitate out of solution and adhere to the internal surfaces of pipes, valves, heat exchangers, etc. These scales are very expensive to manage and usually set a limit on how much heat can be extracted from the source water.

As such, currently available power generation modules usually limit the input temperature of the power cycle working fluid to above 0° C. in the primary heat exchanger. A higher turbine pressure ratio is enabled by dropping the working fluid temperature below zero. However, conventional geothermal projects are limited by potential freezing and scaling of the geothermal fluid on the other side of the heat exchanger.

These limitations in present technology are traversed by implementing a segregated power cycle system in combination with a closed loop well. The working fluid in the well-loop cycle is formulated so that it doesn't freeze below 0 degrees Celsius, and in the present invention has at least one property selected from the group comprising:

a) a substantially nonlinear temperature enthalpy relationship within the lateral interconnection at pressures greater than 10 MPa and temperatures less than 180° C. to maximize the temperature differential and heat transfer between the fluid and the surrounding downhole heat source;

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection The fluids may be modified with additives to increase efficiency and reliability. Suitable additives include, anti-scaling agents, anti-corrosion agents, friction reducers, and anti-freezing chemicals, refrigerants, biocides, hydrocarbons, alcohols, organic fluids and combinations thereof.

Figure 2:
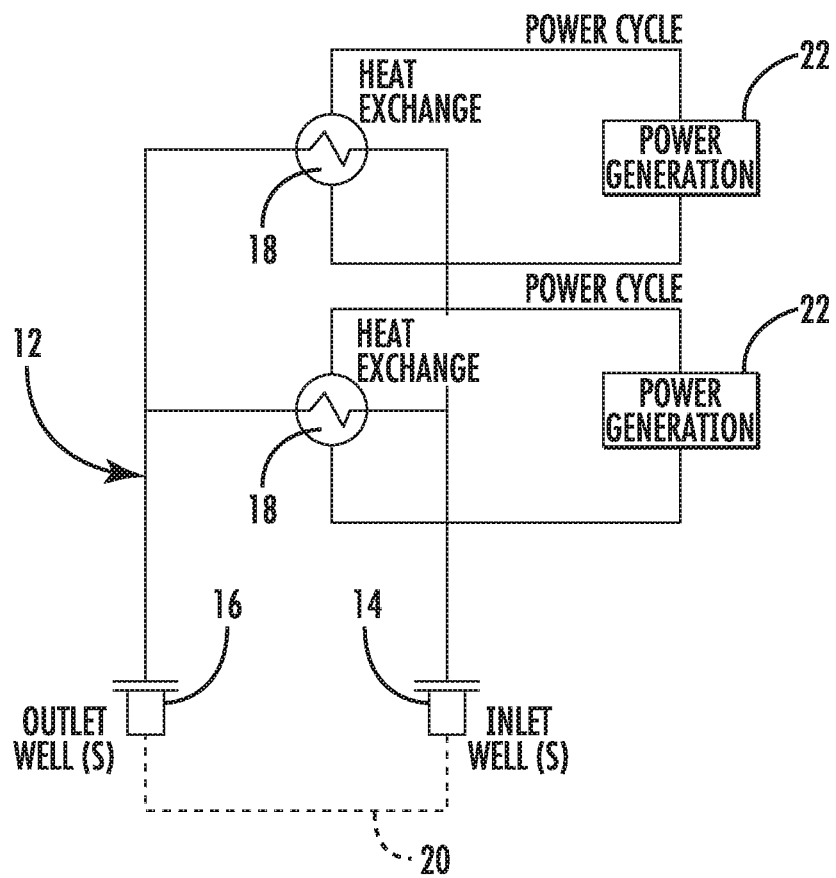
FIG. 2 is a schematic illustration of a segregated well loop and power cycle with power circuits in parallel.
Figure 3:
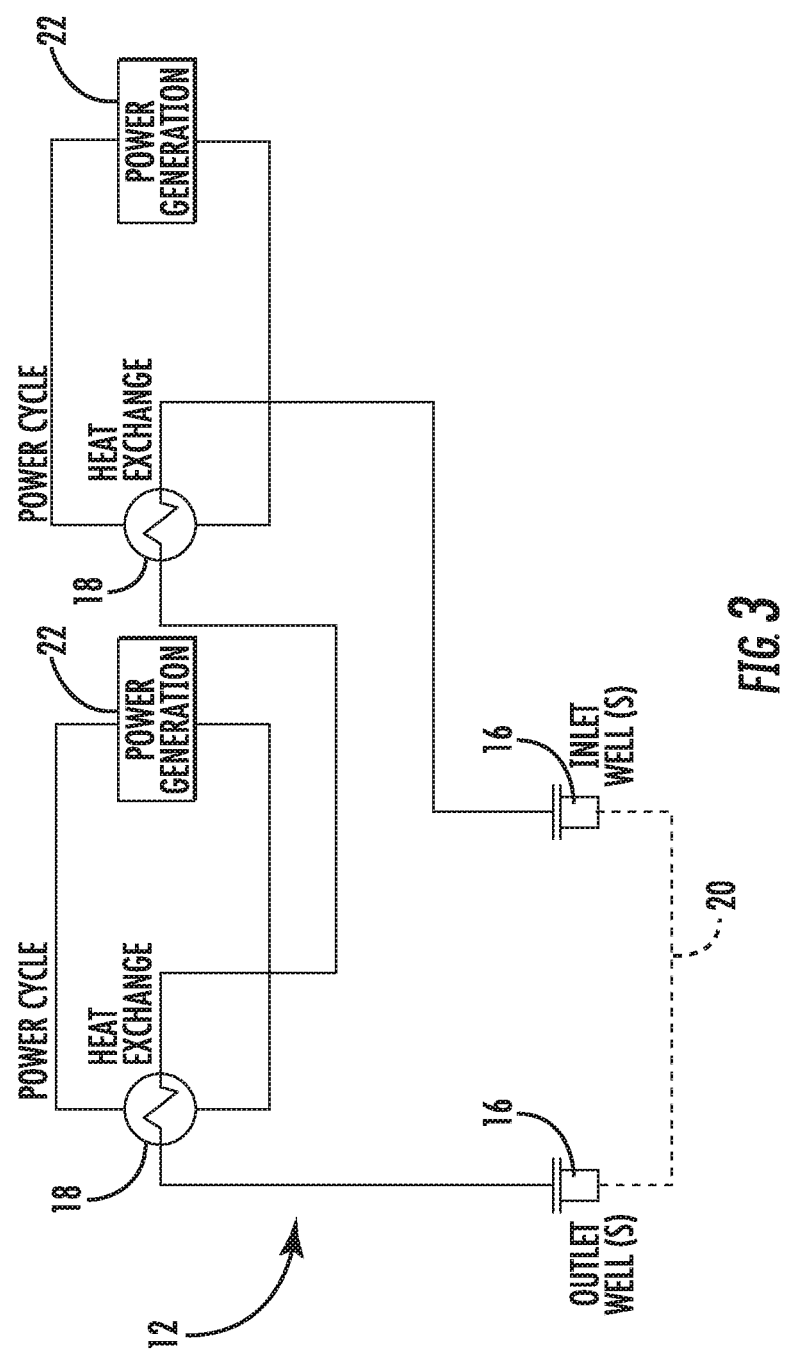
FIG. 3 is a schematic illustration of a segregated well loop and power cycle with power circuits in series.

Optional arrangements with the segregated circuit are illustrated in FIGS. 2 and 3.

FIG. 2 illustrates a segregated circuit incorporating a well loop 12 in thermal contact with two distinct heat exchangers 18 each with its own power generator 22 forming a parallel arrangement. Similarly, FIG. 3, illustrates a serial arrangement.

Figure 4:
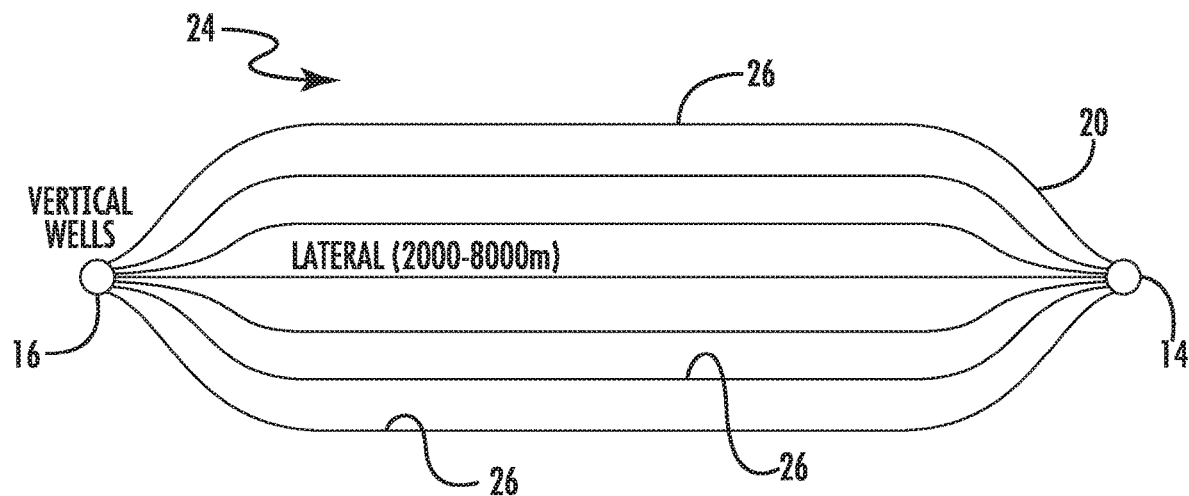
FIG. 4 is a schematic illustration of the multilateral conduit system.

Referring initially to FIG. 4, schematically illustrated is partially cut away view of a multilateral well loop system, globally denoted by numeral 24. In this arrangement, a plurality of horizontal well loop segments 20 are disposed within the formation (not shown) in spaced apart generally parallel relation. Each of the segments 20 is commonly connected to an inlet well 14 and an outlet well 16 in a closed loop.

The geological formation, may be, for example, a geothermal formation, low permeability formation, sedimentary formation, volcanic formation or "basement' formation which is more appropriately described as crystalline rock occurring beneath the sedimentary basin (none being shown).

Figure 5:
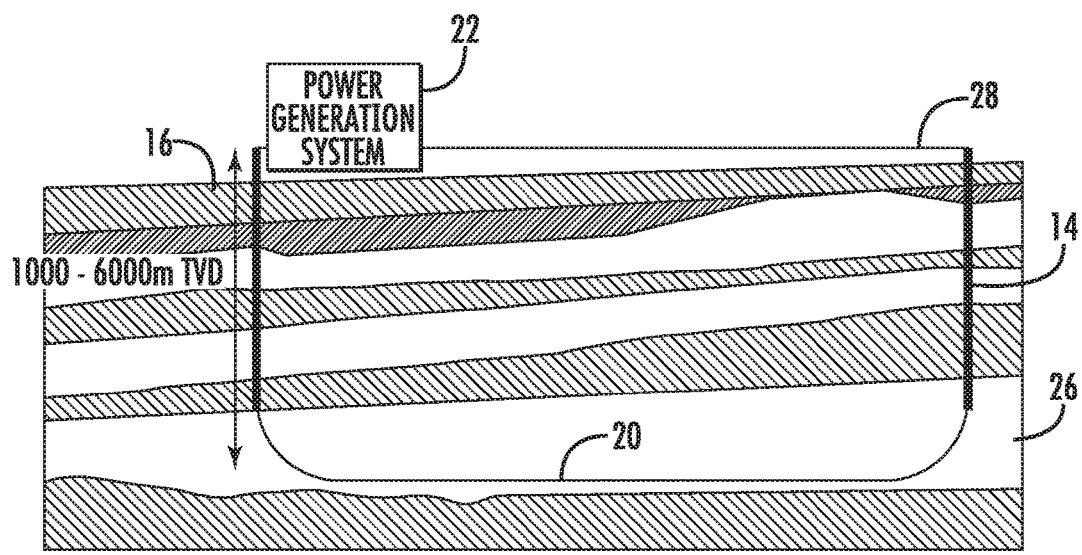
FIG. 5 is a cross sectional view of the well loop and multilaterals in situ within a geological formation.

FIG. 5 schematically illustrates the disposition of the elements within a geological formation 26.

As an example, the horizontal segments 20 may be anywhere from 2000 metres to 8000 metres or more in length and from 1000 metres to 6000 metres in depth from the surface 28. A power generation circuit 22 on surface 28 is disposed between the inlet well 14 and the outlet well 16 to complete the closed loop system.

It will appreciated by those skilled in the art that the dimensions are exemplary only and will vary depending on the properties of the formation, area, geothermal gradient, surface anomalies, tectonics, etc.

As will be evident, owing to advances in engineering, intrusiveness for establishing the multilateral arrangement is minimal and simplified to provide a substantial increase in surface area for the loops to contact the formation. Further, retrofit applications are possible for unused or suspended oil wells to repurpose same with negligible environmental impact.

Figure 6:
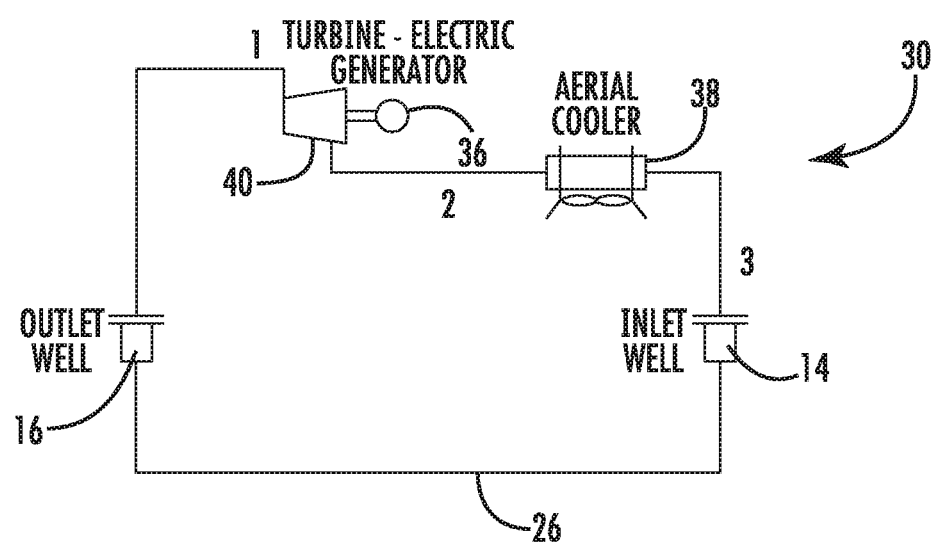
FIG. 6 is a schematic illustration of an integrated well loop power cycle in one embodiment.

The integrated well loop power cycle is a closed loop system in which the selected working fluid is circulated within the well loop and then flows into a turbine on surface as shown in FIG. 6. Numeral 30 denotes the overall process schematic. In this process, a single-fluid is used rather than having a discreet well loop fluid and a secondary power cycle working fluid. The working fluid in this closed loop cycle can operate either as a transcritical cycle, whereby the fluid is supercritical at the upper working pressure and subcritical at the lower working pressure, or as an entirely supercritical cycle whereby the fluid remains supercritical at the lower working pressure.

As is known, a transcritical cycle is a thermodynamic cycle where the working fluid goes through both the subcritical and supercritical states.

The apparatus further includes a cooling device, shown in the example as an aerial cooler 32 and turbine 34 with generator 36. The aerial cooler 32 is used to cool the working fluid to a temperature between 1° C. and 15° C. above ambient temperature. It is also to be noted that the working fluid can be cooled to a subzero° C. temperature.

In addition, suitable fluids for use in the technology set forth herein are capable of transitioning from a supercritical state at the outlet well to a transcritical state after expanding and cooling, wherein the fluid exiting the outlet well has an entropy sufficiently high to expand to a superheated vapor state to the right of the two phase region on a Temperature-Entropy graph and upon cooling is substantially below its critical point.

The driving mechanism in this integrated cycle is a very strong thermosiphon which arises due to the density difference between the inlet vertical well 14 and the outlet vertical well 16. The fluid is in a supercritical liquid state in the inlet well 14, heats up as it travels along the lateral sections 12 and exits in a supercritical state in the outlet well 16, which creates significant pressure.

Figure 7:
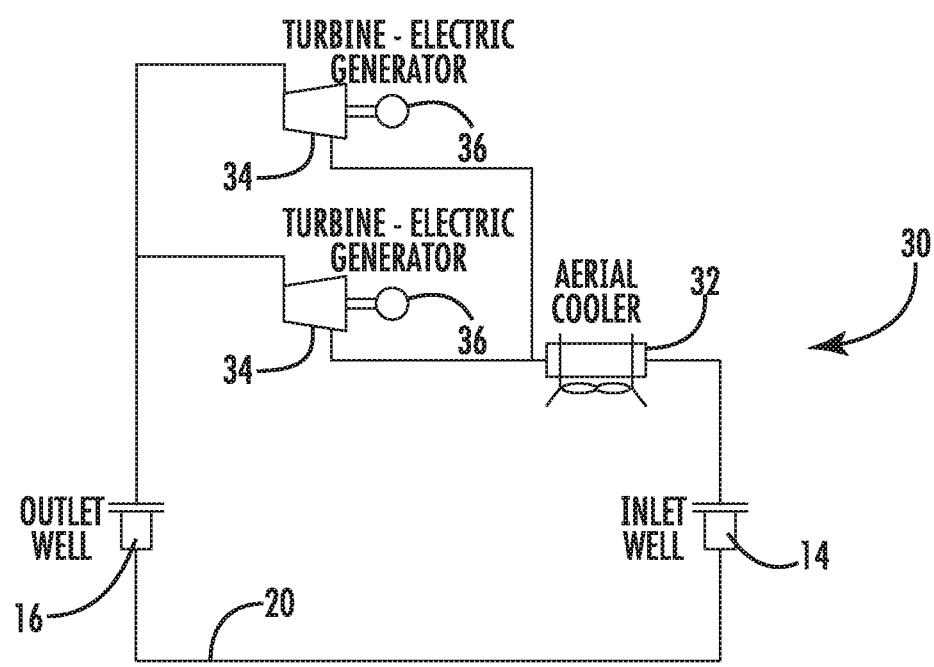
FIG. 7 is a schematic illustration of an integrated well loop power cycle in a second embodiment.

FIG. 7 is a variation of the flow diagram illustrated in FIG. 6, where a plurality of turbines 34 and generators 36 are disposed in a parallel relationship. Other variations including combinations of series and parallel will be appreciated by those skilled in the art.

Figure 8:
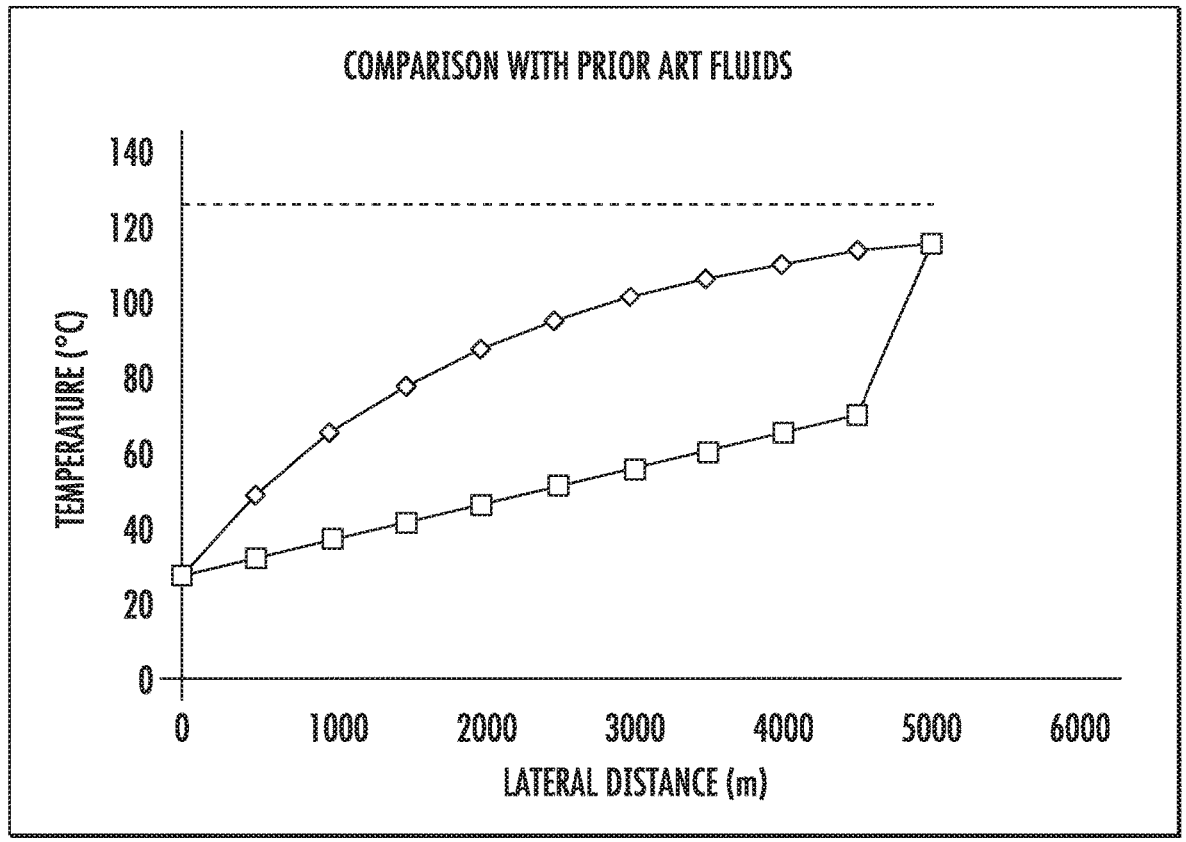
FIG. 8 is a generic schematic of the fluid temperature within the lateral portion of a well loop, for simple fluids described in prior art, and the novel fluids described herein that demonstrate a non-linear temperature-enthalpy relationship.

FIG. 8 is an illustrative schematic of the fluid temperature within the lateral portion of a well loop, for simple fluids described in prior art, and the novel fluids described herein that demonstrate a non-linear temperature-enthalpy relationship. The heat transferred from the rock is proportional to the cumulative area between the rock temperature and the fluid temperature. Table 1 tabulates the data.

TABLE 1

FLUID DATA FOR INCREASING WELL DISTANCE

| DISTANCE (m) | ROCK TEMP (° C.) | SIMPLE FLUID NEAR LINEAR TEMP-ENTHALPY RELATIONSHIP (° C.) | FLUID CLASSES WITH SUBSTANTIALLY NON LINEAR TEMP-ENTHALPY RELATIONSHIP (° C.) |
|---|---|---|---|
| 0 | 125 | 29 | 28 |
| 500 | 125 | 49 | 33 |
| 1000 | 125 | 65 | 37 |
| 1500 | 125 | 78 | 42 |
| 2000 | 125 | 88 | 47 |
| 2500 | 125 | 95 | 51 |
| 3000 | 125 | 102 | 56 |
| 3500 | 125 | 106 | 61 |
| 4000 | 125 | 110 | 65 |
| 4500 | 125 | 113 | 70 |
| 5000 | 125 | 116 | 115 |

The thermosiphon effect can completely eliminate the need for a surface pump under normal operating conditions except during start-up. Advantageously, this eliminates the power required to operate the pump and increases the net electrical power output.

Working in concert with the well loop circuit is the use of customized fluids and mixtures tailored to the wellbore layout, depth, length, and ambient temperature. The prior art relevant at high pressures greater than 10 MPa and temperatures less than 180° C. only discusses the use of fluids with a linear temperature-enthalpy relationship, such as water, carbon dioxide, refrigerants, or hydrocarbon fluids. With a closed-loop system such as that discussed herein, the initial cost and complexity of fluid mixtures is only a minor factor in the overall economics. So other fluids can be used such as a fluid having at least one property selected from the group comprising:

a) a substantially nonlinear temperature enthalpy relationship within the lateral interconnection at pressures greater than 10 MPa and temperatures less than 180° C. to maximize the temperature differential and heat transfer between the fluid and the surrounding downhole heat source;

b) capable of undergoing a pressure-sensitive reversible reaction which is endothermic at elevated pressure and exothermic at pressure lower than the elevated pressure;

c) a fluid mixture containing a chemical absorption reaction which is endothermic within the lateral interconnection;

d) an aqueous electrolyte solution with temperature and pressure dependent solubility, resulting in an endothermic effect within the lateral interconnection.

It has been found that fluids that exhibit a substantially non-linear temperature-enthalpy relationship within the lateral portion of the well loop and/or that exhibit a pressure-sensitive reversible effect which is endothermic at elevated pressure and exothermic at pressure lower than the elevated pressure can increase power generation considerably. This develops because the average temperature differential between the far-field rock temperature and the circulating fluid temperature is increased, driving increased heat transfer from the geologic formation.

An example of this type of fluid is an aqueous precipitate/electrolyte solution with temperature-dependent solubility, wherein the water is super saturated at the top of the inlet well. The solid particles are held in suspension with an anti-scaling agent (anti-flocculation agent) and with turbulent flow (similar to a drilling mud). In the lateral sections, the temperature is increasing, hence the solubility of the solids held in suspension is also increasing. This allows the solution to endothermically absorb heat from the rock (basically increases the effective heat capacity of the fluid) as the solid particles dissolve into the water. In the heat exchanger to the segregated heat-to-power cycle, temperature is decreasing, so the solid substance is precipitating exothermically. The heat exchanger may be treated to avoid precipitates adhering to the interior surfaces.

Fluids for application in a closed-loop geothermal system include aqueous solutions with the following solutes as examples:

potassium bromide, magnesium sulphate.

To use a single turbine and have adequate efficiency over an entire range of ambient conditions is problematic. It has been found that use of two or more turbines in series or parallel which are optimized for different ambient conditions addresses the problem. During periods of colder temperatures, control logic (not shown) automatically shifts the working fluid to the appropriate turbine to maintain high efficiency throughout the year.

Figures 9, 9A:
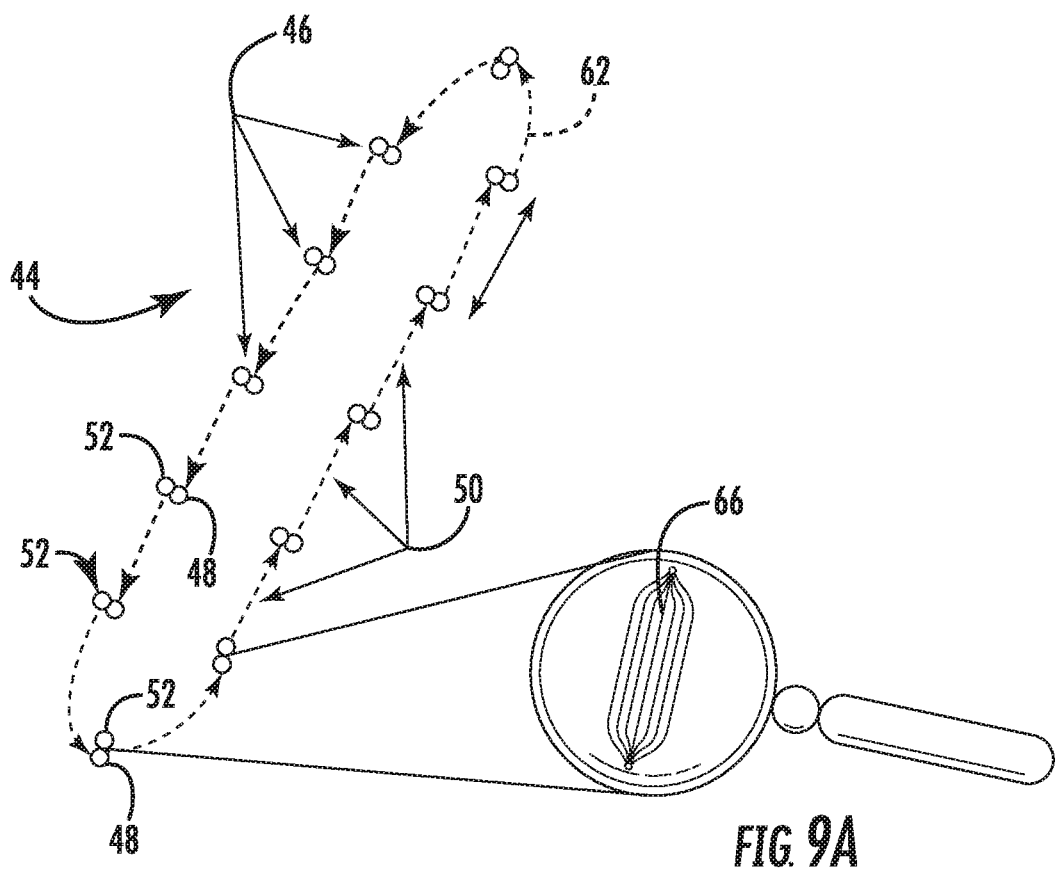
FIG. 9 is a top view of daisy chained wells in a first embodiment.
FIG. 9A is an enlarged view of the multilateral arrangement of conduits employed in the arrangement.
Figure 10:
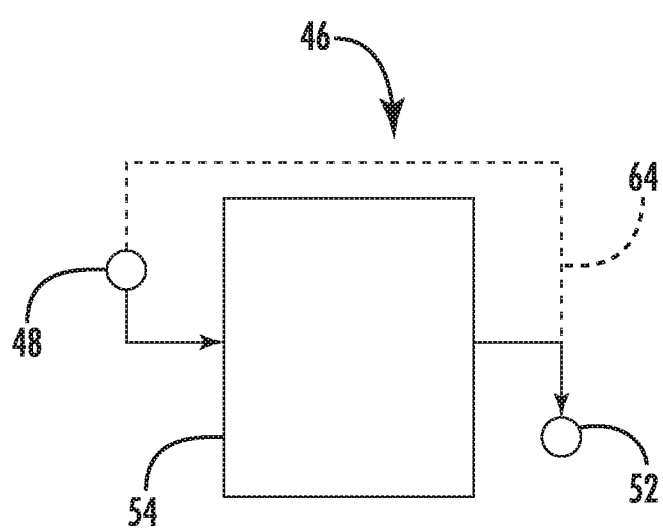
FIG. 10 is an enlarged view of the power generation apparatus as disposed between the inlet of one well and the output of an adjacent well.

Referring now collectively to FIGS. 9, 9A and 10 shown is a schematic illustration of a daisy chain of wells, globally denoted by numeral 44. In this embodiment, each surface location, generally denoted by numeral 46, includes an injection well 48 connected to a lateral well conduit 50 and production well 52. In this manner, the continuous well structure subscribes to a generally U shaped structure.

As illustrated in FIG. 9, each location 46 is discrete and linked to proximal locations in an elegant and advantageous manner. As an example, the distance between locations may be 5000 meters. This will, of course, vary from one situation to another.

In FIG. 10, numeral 54 is representative of the power generation apparatus. Selections for the apparatus 54 will be discussed herein after, however for purposes of discussion, the apparatus 54 is responsible for converting steam into electrical energy. At each location 46, there is the injection well 48 and production well 52. The multilateral conduits 38 are similarly subterranean, but also within a geothermal zone 46 of formation 48.

For operation, FIG. 10 may also be referenced. A fluid with a suitable heat capacity is circulated in the injection well 48 of one location 46, processed through power generation apparatus 54 to recover the heat energy and subsequently passed as an output stream to be an inlet feed stream for a injection well 48 of a proximal location 46. The chain line 62 illustrates this relay or daisy chain sequencing. Since not all of the heat is recovered, the inlet feed stream for well 48 of a proximal location is preheated for injection into lateral conduit 50. The process then resets for repetition in the next location 46. For convenience of repair, analysis, etc. power generation apparatus includes a bypass loop 64 for bypassing the apparatus 54.

In order to accommodate variable conditions such geological, environmental, thermal, etc. an array of conduits 50 may be employed as illustrated in FIG. 9A. The arrays will be referenced as multilateral arrays 66 and are arranged in an annular pattern in spaced relation from proximal conduits 50. Other patterns may be employed depending on the specifics of the situation. Connection between the individual conduits 50 of an array 66 will simply be integrated in a merger acting in a similar fashion to a single conduit 50. All or some of the locations 46 may be fabricated in this way, depending on the conditions of which examples have been referenced above. It is further contemplated that singular conduit arrangements may alternate with arrays 66. The arrays 66 increase the overall flow rate and power production. In situations where some locations 46 are closer together, a greater number of arrays 66 may be used to maintain heat recovery balance. The arrangement shown in FIG. 9 is exemplary of a 12,000 kW to 20,000 kW system.

Figure 11:
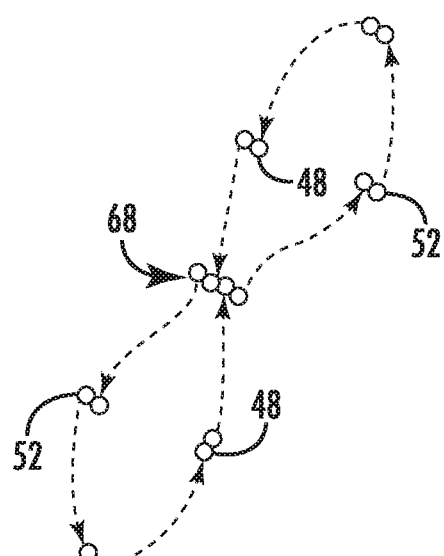
FIG. 11 is a top view of two daisy chained well loops integrated.

Turning now to FIG. 11, shown is a further embodiment of the invention for example, an 8,000 kW to 12,000 kW system. In this example, individual loops may be joined at a centralized location 68 in order to centralize the power generation apparatus (not shown) for increased power and efficiency.

Figure 12:
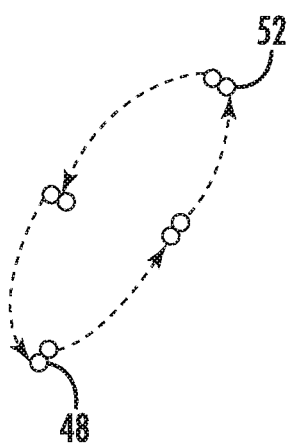
FIG. 12 is a top view of another embodiment of the present invention.
Figure 13:
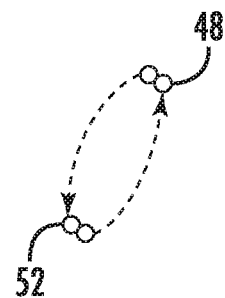
FIG. 13 is a top view of yet another embodiment of the invention.

FIGS. 12 and 13 illustrate smaller scale operations, 4,000 kW-6,000 kW (FIG. 12) and 2,000 kW-3,000 kW (FIG. 13).

One of the significant features of employing the daisy chain implementation is the lack of a requirement for a near surface return conduit. When required, as in conventional well loop arrangements, capital costs exceed 10% of the total project capital, there may be a need to negotiate rights of way and a 3-5° C. heat loss and a pressure loss results causing lower efficiency.

By contrast, the daisy chaining, since well loops are linked front to back, eliminates the need for a near surface return conduit. Further, the paired loops act as the return conduit for each other with the pair using waste heat as an input to create the preheated stream supra.

Other advantages include increased power production with no surface disruption (footprint) since everything is subsurface and reduced distance between locations 46. This commensurately reduces cost if shorter conduit 50 can be used owing to the increased temperature of the preheated feed stream design.

Figure 14:
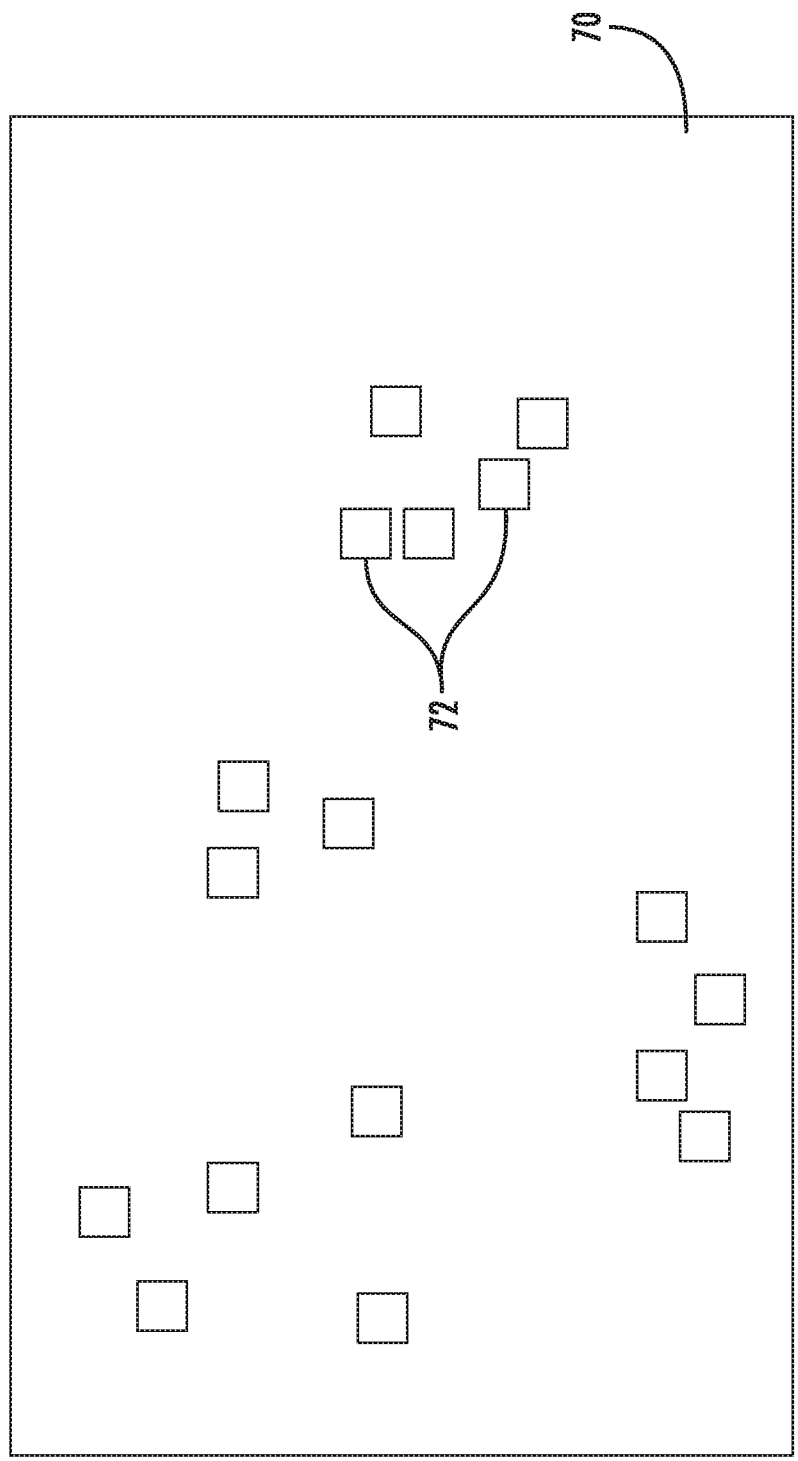
FIG. 14 is a schematic illustration of an array of unused wells.

Referring now to FIG. 14, shown is a schematic illustration of a drilled area generally denoted by numeral 70 with a plurality of dispersed unused wells 72.

Figure 15:
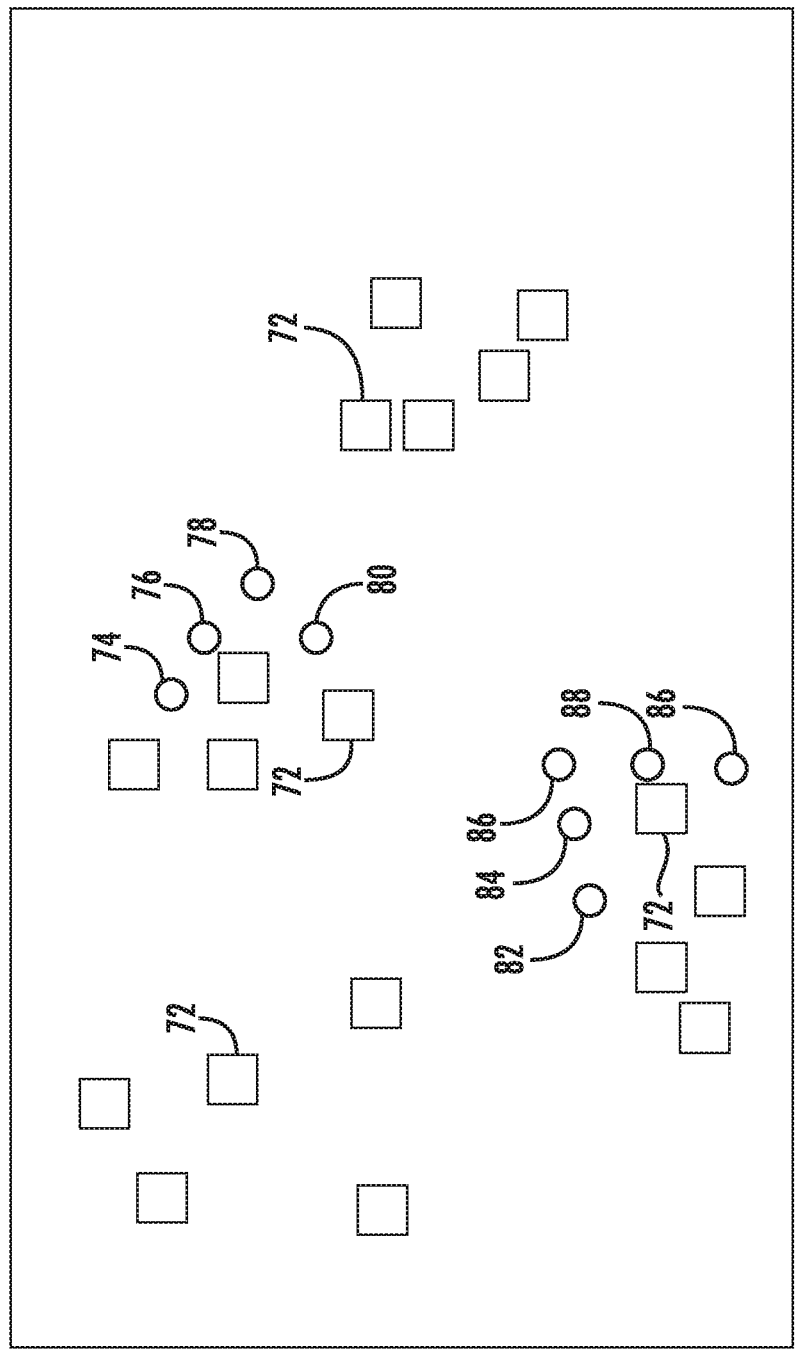
FIG. 15 is a view similar to FIG. 14 illustrating the positioning of new wells disposed within the unused wells.

Referring now to FIG. 15, shown is a similar illustration to FIG. 14, however a plurality of new wells 74 through 88 have been drilled proximate a respective unused well 72.

Figure 16:
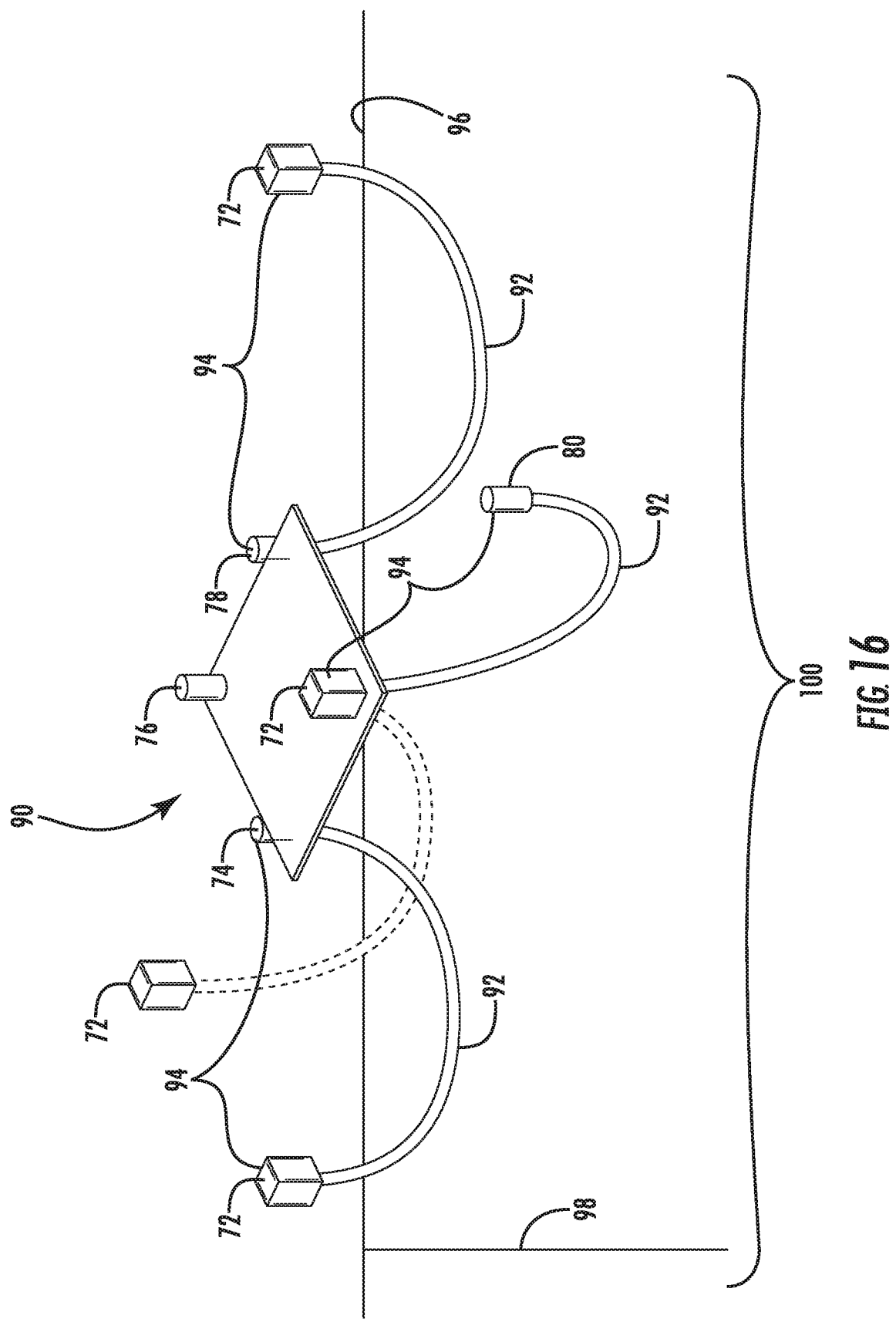
FIG. 16 is a first schematic representation of one embodiment of the present invention where new wells are clustered with unused wells.

Turning to FIG. 16, a main hub 90 is provided. Although not specifically shown, hub 90 is effectively a manifold arrangement where each of the new wells, for example, 74, 76, 78 and 80 are in fluid communication discussed in greater detail herein after. From the hub 90, each of the new wells 74, 76 and 78 are spaced from each other and unused well 72 associated with the hub 90. Each new well 74, 76 and 78 is in fluid communication with a single proximate unused well 72. Fluid communication is achieved by piping 92 and 94. Piping 92 is disposed below the surface 96 and more specifically within a geothermal zone, generally denoted by numeral 98. As is illustrated, piping 92 is disposed above the surface 96 in the example, however it may be disposed below surface 96 which will be shown in the advancing Figures.

Conveniently, hub 90 with the new wells 74, 76 and 78 in the example are connected to a respective unused well 72 to form clusters of recycled unused wells.

Figure 17:
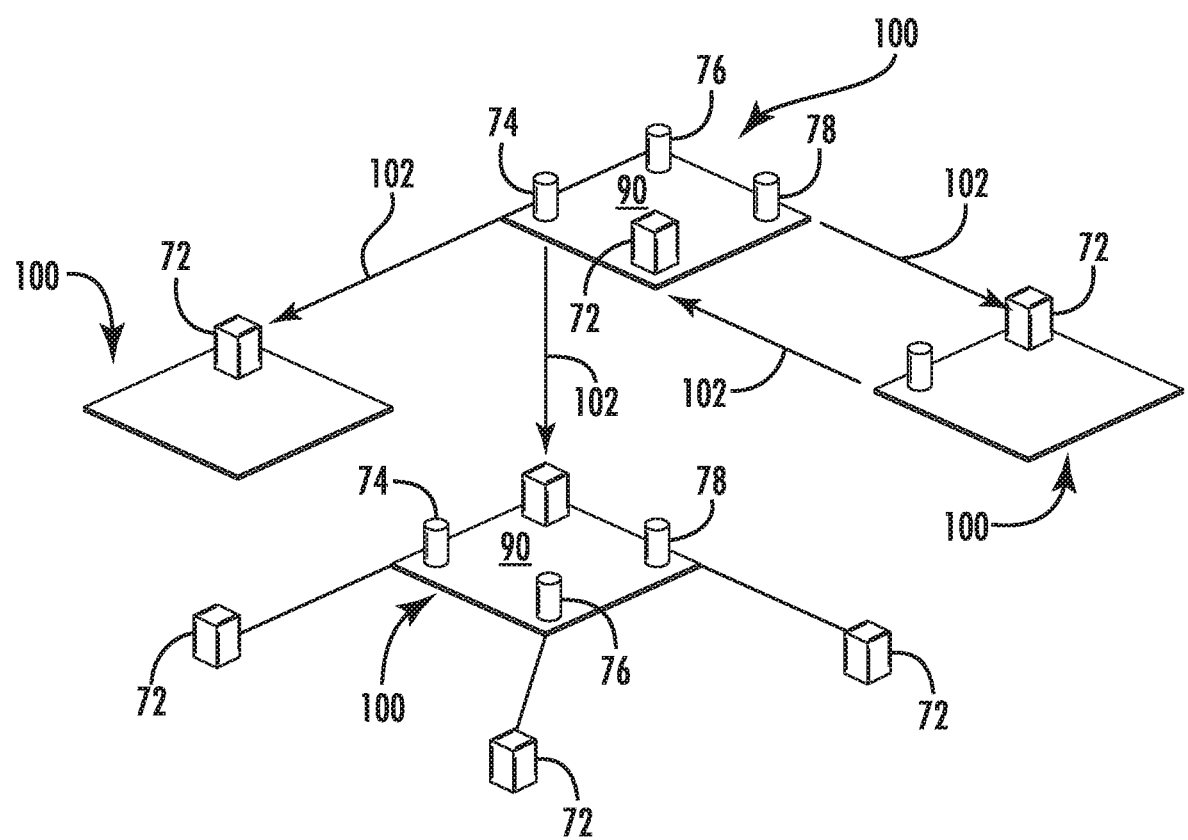
FIG. 17 is a schematic representation invention where the clusters are consolidated.

For clarity, FIGS. 16 and 17 can be referenced together and the loops 92 and 94 are absent in FIG. 17 for purposes of clarity. A cluster can be referenced in FIG. 16 denoted by numeral 100. The clustering is effective for linking additional clusters 100 as shown in FIG. 17. The new wells 74, 76 and 78 associated with a given hub 90 link other clusters 100 by way of an unused well 72 from an adjacent cluster 100. Such a link is referenced as 102 for purposes of explanation. In this manner, the clusters 100 are consolidated as an energy collecting system as opposed to a random unproductive array of unused wells 72 shown in FIG. 15. This provides a high efficiency arrangement for collecting geothermal energy in a closed loop surface to surface design.

Geothermal loops have been proposed ostensibly in the prior art discussed supra, however, in mosaic, the prior art has not provided adequate guidance in terms of the surface to surface energy recovery, minimal geological and environmental invasiveness unified with consolidated recycling.

Figure 18:
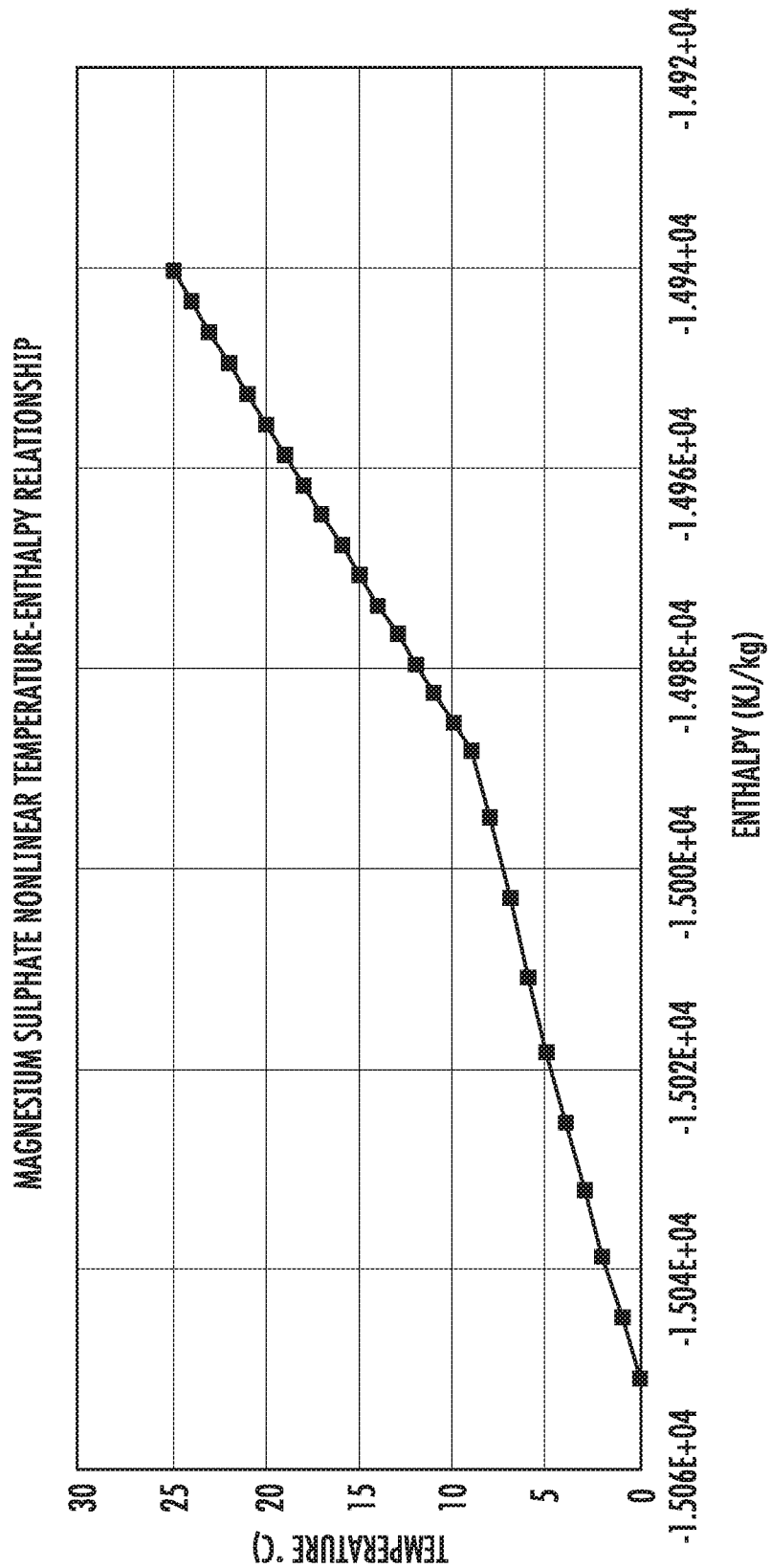
FIG. 18 is a graphical example of a nonlinear temperature-enthalpy relationship for an aqueous electrolyte solution containing 20% magnesium sulphate at an elevated pressure of 40 MPa.

Turning now to FIG. 18, shown is the nonlinear temperature-enthalpy relationship of an aqueous solution of 20 mass percent magnesium sulphate at 40 MPa. This is shown as an example of the type of fluid thermodynamic behavior described in the current invention. The specific fluid chemistry utilized in practice depends on the project specifics such as rock temperature, direct heat or electricity application, specified inlet/outlet temperature, well length and configuration, among other factors.

In conclusion, new technology has been presented for generating power in a unique closed loop arrangement within a variety of geological formations using unique working fluids.

Integrated and segregated loops with improved fluids have been delineated resulting in enhanced heat capture relative to prior art.

Multilateral segments in the loop commonly connected to the inlet and outlet of the loop have been discussed in many terms not the least of which is the improvement to existing loop arrangements.

We claim:

1. A method of generating power, comprising:
   in a closed well loop circuit having an inlet and an outlet connected with a lateral conduit within a geological formation and having a power generation apparatus in operative communication with said well loop circuit,
   circulating a working fluid within said lateral conduit, said working fluid comprising an aqueous electrolyte solution and configured to have a substantially nonlinear temperature enthalpy relationship at pressures greater than 10 MPa and temperatures less than 180° C. when said fluid is within said lateral conduit, transferring heat between said fluid and a surrounding downhole heat source at the lateral conduit as said fluid flows through the lateral conduit, recovering heat energy from said geological formation;
   cooling said working fluid prior to recirculation in said well loop circuit at said inlet; and
   converting energy from said fluid into electrical power.

2. The method as set forth in claim 1, wherein cooling said working fluid comprises cooling said working fluid to a sub-zero° C. temperature.

3. The method as set forth in claim 1, wherein circulating the working fluid comprises driving said working fluid by thermosiphon action.

4. The method as set forth in claim 1, wherein the closed well loop circuit comprises a plurality of lateral conduits in spaced relation with respect to each other, each of the plurality of lateral conduits connected to said inlet and said outlet, and circulating the working fluid comprises circulating the working fluid within said plurality of lateral conduits, transferring heat between said fluid and the surrounding downhole heat source at the plurality of lateral conduits as said fluid flows through the plurality of lateral conduits, recovering heat energy from said geological formation.

5. The method of claim 1, wherein said lateral conduit comprises a wellbore.

6. A method of repurposing an oilfield to capture heat energy, the oilfield having pre-existing production wells and injection wells in spaced relation in a geological heat bearing formation;
   providing a first power generator in fluid communication with a first node having a first production well and a first injection well;
   providing a second power generator in fluid communication with a second node having a second production well and a second injection well in spaced relation to said first node;
   connecting said first node and said second node in a subterranean horizontal connection within said heat bearing formation;
   circulating heated output fluid from said first power generation apparatus of said first node to an input of said second power generation apparatus of said second node with a subterranean connection, said fluid comprising an aqueous electrolyte solution and configured to have a substantially nonlinear temperature enthalpy relationship at pressures greater than 10 MPa and temperatures less than 180° C. when within said subterranean horizontal connection;
   recovering heat energy from said formation as said fluid flows through the subterranean horizontal connection; and
   converting energy recovered from said fluid into electrical power.

7. The method of claim 6, wherein said aqueous electrolyte solution includes magnesium sulphate.

8. An energy production method, comprising:
   in a suspended oilfield having injection and production well pairs, connecting a power generation apparatus between a production well of one well pair and an injection well of an adjacent well pair in a subterranean loop, said subterranean loop having at least one lateral interconnection between said production well and said injection well, said lateral interconnection being within a subterranean heat source;
   circulating a fluid through said subterranean loop to recover subterranean heat energy, said fluid comprising an aqueous electrolyte solution and configured to have a nonlinear temperature enthalpy relationship at pressures greater than 10 MPa and temperatures less than 180° C. when within said lateral interconnection, transferring heat between the fluid and a surrounding downhole heat source at the lateral interconnection as said fluid flows through the lateral interconnection; and
   at least one of 1) utilizing thermal energy from said fluid directly or 2) converting energy from said fluid into electrical power.

9. The method of claim 8, wherein said aqueous electrolyte solution includes magnesium sulphate.

10. A geothermal method comprising:
    drilling a first generally U shaped bore hole formed into an earth formation and a second generally U shaped bore hole formed in spaced relation therefrom, said earth formation having a downhole heat source;
    obtaining a power generation apparatus;
    connecting, in a subterranean position, said apparatus to an output of said first U shaped bore hole and to an inlet of said second U shaped bore hole with a lateral interconnection;
    circulating a fluid through each said bore hole, said fluid comprising an aqueous electrolyte solution and configured to have a nonlinear temperature enthalpy relationship at pressures greater than 10 MPa and temperatures less than 180° C. when within said lateral interconnection of said U shaped bore hole, transferring heat between the fluid and a surrounding down hole heat source at the lateral interconnection of said U shaped bore hole as said fluid flows through the lateral interconnection of said U shaped bore hole; and
    converting energy recovered from said fluid into electrical power.

11. The method of claim 10, wherein said aqueous electrolyte solution includes magnesium sulphate.

12. A method of forming a geothermal heat exchanger, the method comprising:
    drilling a second well in spaced relation to a first well;
    connecting said first well and said second well within a geothermal zone and a second zone spaced therefrom in a continuous loop having at least one lateral interconnection;
    circulating a working liquid through said loop within said continuous loop, said fluid comprising an aqueous electrolyte solution and configured to have a nonlinear temperature enthalpy relationship at pressures greater than 10 MPa and temperatures less than 180° C. when within said lateral interconnection, transferring heat between the fluid and the surrounding geothermal zone as said fluid flows through the lateral interconnection.

13. The method of claim 12, wherein said aqueous electrolyte solution includes magnesium sulphate.

14. A method for recycling unused drilled wells, the method comprising:
- designating a first well as a receiving hub;
- drilling a second well adjacent said hub;
- drilling at least a third well spaced from said hub and said second well;
- fluidly connecting each of said second well and said third well with said hub in individual closed loops each having at least one lateral interconnection, a first section of each loop being within a geothermal zone and a second section being above said geothermal zone;
- circulating a working fluid within said loops, said fluid comprising an aqueous electrolyte solution and configured to have a nonlinear temperature enthalpy relationship at pressures greater than 10 MPa and temperatures less than 180° C. when within said lateral interconnection, transferring heat between the fluid and a surrounding down hole heat source as said fluid flows through the lateral interconnection; and
- capturing heat energy transferred from said geothermal zone.

15. The method of claim 14, wherein said aqueous electrolyte solution includes magnesium sulphate.

* * * * *